United States Patent [19]
Krulls et al.

[11] 3,710,478
[45] Jan. 16, 1973

[54] BRUSH REPLACEMENT DEVICE
[75] Inventors: Gerd E. Krulls, Scotia; William H. Ruth, Schenectady, both of N.Y.
[73] Assignee: General Electric Company, Schenectady, New York
[22] Filed: March 25, 1971
[21] Appl. No.: 128,344

[52] U.S. Cl. ............................ 29/205 R, 310/239
[51] Int. Cl. ..................... H02k 15/00, F16c 33/00
[58] Field of Search..29/205 R, 205 D, 225; 310/239

[56] References Cited

UNITED STATES PATENTS

| | | | |
|---|---|---|---|
| 3,006,063 | 10/1961 | Linan | 29/205 R |
| 3,387,155 | 6/1968 | Krulls | 310/239 |
| 3,432,708 | 3/1969 | Bissett | 310/239 |

Primary Examiner—Thomas H. Eager
Attorney—William C. Crutcher, James W. Mitchell, Frank L. Neuhauser, Oscar B. Waddell and Joseph B. Forman

[57] ABSTRACT

A brush replacement device for a dynamoelectric machine comprising a brush holder and a removable handle which is keyed to the brush holder. The brush holder is locked to a bus bar supported about the periphery of a collector ring. The removable handle is inserted into the brush holder and turned to unlock the brush holder from the bus bar. This motion simultaneously activates a spring means which secures a brush in the brush holder while it is being withdrawn or inserted about the periphery of the collector ring.

5 Claims, 2 Drawing Figures

INVENTORS:
GERD E. KRULLS,
WILLIAM H. RUTH,
BY James W Mitchell
THEIR ATTORNEY.

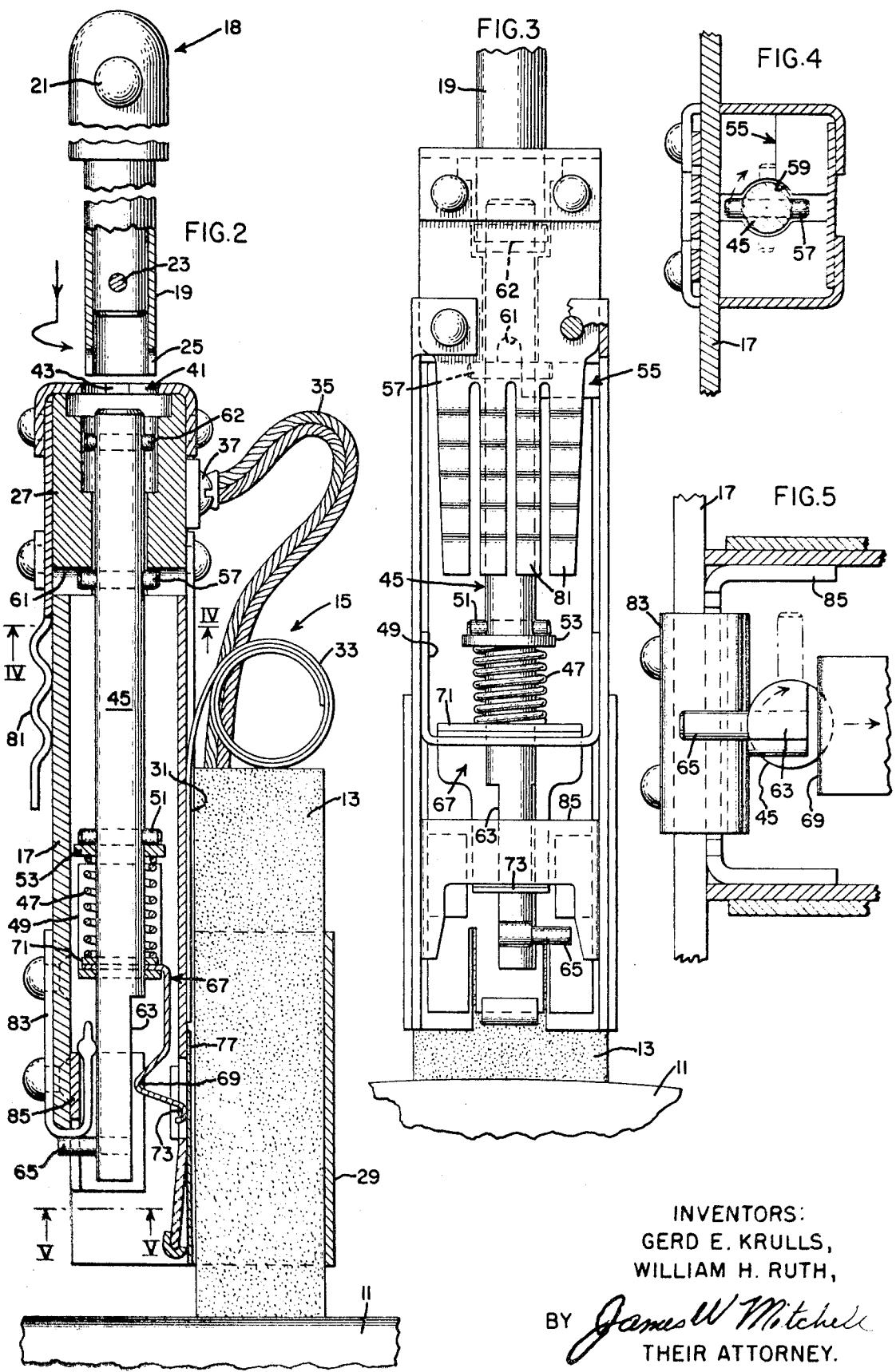

BRUSH REPLACEMENT DEVICE

BACKGROUND OF THE INVENTION

This invention relates generally to the maintenance performed in replacing worn brushes on a dynamoelectric machine. In particular, a brush holder is provided about the periphery of a collector ring of the dynamoelectric machine which may be removed and replaced by a separate handle keyed to the brush holder.

Increasing power supply requirements have resulted in critical loads being placed on power generation systems so that it is mandatory that routine servicing operations be performed upon power generation systems without the necessity of shutting down system components which overload the remaining in-service system components. One such routine servicing operation is the replacement of worn brushes about the periphery of the collector rings of a dynamoelectric machine. It has long been necessary to shut down the dynamoelectric machine, and engage in a tedious brush replacement operation at the machine site and then restart the machine. This results in lost hours of machine operation, and necessitates replacement of all brushes whether fully worn or not so that maximum interval between servicing operations can be maintained.

Some devices are known in the prior art which avoid the necessity of machine shutdown and allow relatively easy brush replacement. One such device, holds a plurality of brushes and has a self-contained handle. Such a device is rather expensive to fabricate, and was intended for replacement of a "rack" of brushes rather than replacement of individual brushes. Another device known in the prior art provides for individual brush replacement and also has a separate handle for brush holder removal, but no positive means are provided for brush retention in the holder during withdrawal and insertion of the brush holder about a bus bar. These devices have been described respectively in more detail in U.S. Pat. Nos. 3,387,155 issued June 4, 1968 to Krulls, and 3,432,708 issued Mar. 11, 1969 to Bissett, both assigned to the assignee of the present invention.

OBJECTS OF THE INVENTION

Accordingly, it is an object of this invention to provide an improved device permitting the replacement of worn brushes without requiring shutdown of a dynamoelectric machine.

It is another object of this invention to provide a device which will facilitate brush removal by providing positive retention of a brush during removal and insertion steps of brush maintenance.

Another object of this device is to provide an improved brush holder with a separate handle which is removable and is suitable for individual servicing of all brush holders about a collector ring.

Other objects and advantages will become apparent from the following description of one embodiment of the invention and the novel features will be particularly pointed out hereinafter in the claims.

BRIEF DESCRIPTION OF THE DRAWINGS

FIG. 2 is a side view of the present invention in section to expose the interior portion of the invention.

FIG. 3 is a rear view of the present invention with the handle portion rotated ninety degrees and partially cut away.

FIG. 4 is a section taken at IV—IV on FIG. 2.

FIG. 5 is a section taken at V—V on FIG. 2.

SUMMARY OF THE INVENTION

Figure 1:
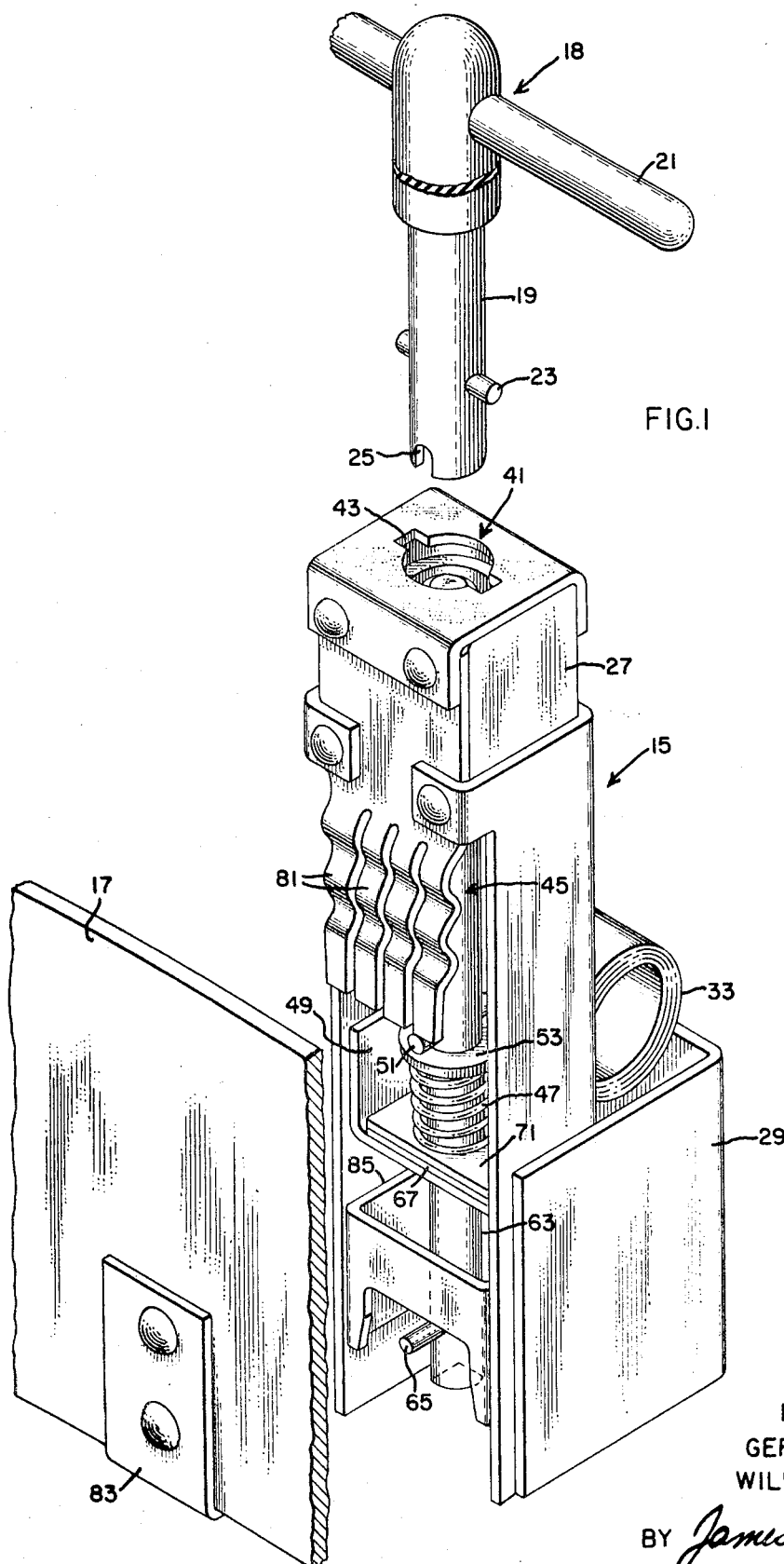
FIG. 1 is a perspective view of the present invention detached from a bus bar which is partially shown.

A brush holder and removable handle are provided about the periphery of a collector ring in a dynamoelectric machine. When the handle is inserted into the brush holder and rotated, it unlocks the brush holder from the machine while it simultaneously activates a spring means for retaining the brush within the brush holder during the removal and replacement operation.

DETAILED DESCRIPTION OF THE INVENTION

Referring now to the drawings, the general environment surrounding the invention may be described. A collector ring 11 mounted about the shaft of a dynamoelectric machine (not shown) is contacted by a brush 13 which is partially enclosed by an L - shaped brush holder 15, the latter being in electrical communication with a bus bar 17 on which it is removably mounted in a manner which will be later described. The bus bars themselves are supported by the dynamoelectric machine frame (not shown) but are insulated therefrom and electrically connected to a source of excitation voltage.

The invention itself is comprised of the brush holder shown generally at 15 and a removable insulated handle shown generally at 18.

The insulated handle 18 may have a plunger-like configuration with an elongated rod portion 19 and a cross member 21 passing therethrough. On the lower portion of the rod, there is a pair of ears 23; and extending inwardly from the bottom edge of the rod is a pair of curved vertical cutouts 25. Obviously, the handle may be made in a variety of ways, i.e., by machine tooling or by fastening several sections telescoped together as is shown generally in FIG. 2. Both the pair of ears and the curved vertical cutouts constitute the key which enables the handle to manipulate the brush holder.

The brush holder is an L-shaped member formed by an elongated rectangular housing 27 and a relatively shorter rectangular brush box 29. Again, the construction may be of one piece construction or composite construction as shown. As illustrated in FIG. 2, when the brush 13 is inserted into the brush box 29 for normal operational use, it must bear against the collector ring 11. To maintain the proper bearing pressure, a leaf spring 31 with a coiled end 33 has been provided and is fixed at the bottom of the front wall of the housing 27. The brush is connected electrically to the brush holder by a lead 35 from the brush to a screw 37 in the front wall of the brush housing.

The elongated housing may be generally hollow except for certain intermediate support structure. At the top of the housing there is a generally circular cutout 41 having ear accommodating cutout portions 43. Within the interior of the housing, there is a rotatable rod 45 which extends the almost entire length of the housing except for a brief distance top and bottom. When the handle is inserted into the housing, the rod 45 is depressed against the action of a compression coil spring 47 which surrounds rod 45. The spring 47 is supported by a flange 49 and restrained on the rod between the flange 49 and a washer 53 bearing against a pair of ears 51. Of course, this construction also restrains any free downward vertical motion of the rod 45. The handle is depressed until ears 23 pass through the cutout 43 and then the rod is rotated 90 degrees in a clockwise direction so that the ears 23 now engage the underside of the top of the housing.

Because of the particular construction of this device as related to its locking features and brush retaining features, rotation of rod 45 is permissible only in a clockwise 90° direction and to this end, a stop 55 is provided within the housing and another pair of ears 57 is provided on the rod as shown in FIG. 4. The stop is formed with a curved portion 59 to accommodate the rod and a vertically offset portion 61 to accommodate vertically upward motion of the rod and to restrain free upward vertical motion beyond the stop.

Rotational as well as vertically downward motion may be imparted to the rod from the handle via the interlocking of cutout 25 provided on the handle, and still another pair of ears 62 on the rod 45 as shown in FIGS. 2 and 3.

The lower section of rod 45, as can be best seen in FIGS. 2 and 5, is provided with a cam portion designated generally at 63. A locking pin 65 extends from the rod and a leaf spring 67 having a crimp 69 abuts the cam portion. The spring 67 is held on the rod between the flange 49 and a plate 71 which serves to hold the spring in place. The free end of the spring 67 is formed with a curved portion 73, which may bear directly on the brush itself or against a thin resilient strip 77 for holding a brush in place. As may be seen in FIG. 5, rotation of the lower end of the rod will cause the cam portion of the rod to bear against the crimp 69 in the spring 67 which in turn bears against a flexible strip 77 recessed in the front wall of the rectangular housing. This strip then applies lateral pressure to the brush and retains it in place during the removal and replacement of the brush holder in the dynamoelectric machine.

A plurality of resilient fingers 81 fixed to the rear of the housing provide an electrical connection between the brush holder and the bus ring. Further, resilient fingers serve to support the upper portion of the brush holder upon the bus ring.

A clip 83 is mounted on the underside of the bus ring as shown in FIG. 2, and engages a flange 85 on the brush holder so as to interlock the brush holder and the bus ring. Referring again to FIG. 5, the position of the locking pin 65 is shown as it engages the underside of the clip 83. This allows the brush holder to be selectively locked to the bus rings.

The manner of operation is as follows. To remove the brush holder from the bus ring, the handle 17 is inserted into top of the housing 27 and depressed against the action of spring 47, and then rotated 90° until rotation is stopped by ears 57 contacting stop 55. At this point ears 23 will bear against the underside of the top of the housing. The rotation of the handle causes rotation of the rod 45 and as seen in FIG. 5, rotates pin 65 free of clip 83 and also causes cam 63 to bear against crimp 69. This causes curved portion 73 of spring 67 to bear against flexible strip 77 which applies lateral pressure to the brush 13 thereby positively retaining the brush in place. The brush holder is then removed from the bus ring.

The brush may now be changed in the brush holder by turning the handle to release the lateral pressure upon the brush so that it will drop out from the brush handle. A new brush is then inserted into the brush holder and the handle is again rotated to hold the brush in place as the brush holder is being replaced onto the bus ring.

In replacing the brush holder, the fingers 83 and the flange 85 are respectively fitted over the bus ring and clip, and then the handle is rotated 90° in the opposite direction to lock the pin 65 under the clip and to free the lateral pressure upon the brush. This also allows ears 23 to align with cutouts 43 for removal of he handle from the brush holder. The brush 13, having been freed of lateral restraint, is free to bear against the collector rings under the influence of spring 31.

While there is shown what is considered at present to be the preferred embodiment of this invention, it is of course understood that various other modifications may be made therein, and it is intended to cover in the appended claims all such modifications as fall within the true spirit and scope of the invention.

What is claimed is:

1. In a dynamoelectric machine of the type having a rotating collector ring and a plurality of brushes mounted on a stationary bus bar adjacent said collector ring, a brush replacement device comprising:
   a brush holder having a brush slidably positioned therein and having means biasing said brush against said collector ring,
   an insulated handle removably inserted into said brush holder,
   a rod rotatably fitted within the brush holder and adapted to be rotated by said handle to release the brush holder from the bus bar, and
   a spring means mounted in said brush holder and arranged to be actuated by rotation of said rod so that said spring means may bear against said brush to secure it in said brush holder when the brush holder is released from the bus bar.

2. The brush replacement device as recited in claim 1, wherein said spring means comprises a leaf spring and wherein the lower portion of said rotatable rod defines a cam portion which may alternately bear against the leaf spring for securing a brush during removal and replacement of the brush holder.

3. The brush replacement device as recited in claim 1, wherein said brush holder includes resilient fingers grasping said bus bar and electrically connected to said brush, and wherein said rod includes locking means cooperating with the bus bar to alternately lock or release the brush holder therefrom when the rod is rotated.

4. The brush replacement device as recited in claim 3 wherein said locking means comprises a locking pin extending from the lower portion of the rod for locking the brush holder onto the bus bar.

5. A brush replacement device, for use in a dynamoelectric machine of the type having a rotating collector ring, and a plurality of brushes supported from a stationary bus bar positioned adjacent said collector ring, comprising:
- a brush holder having a brush slidably positioned therein and having means biasing said brush against said collector ring,
- an insulated handle removably inserted into said brush holder,
- a rod rotatably fitted within said brush holder and adapted to be rotated by said handle,
- a spring means mounted in said brush holder and arranged to be actuated by rotation of said rod so that said spring means may bear against said brush to secure it in said brush holder, and
- a locking pin mounted on said rod for engaging said bus bar, whereby rotation of the handle causes the rod to rotate, thereby freeing the brush holder and securing the brush in the brush holder.

* * * * *